Aug. 26, 1947. E. MALAGUTI 2,426,363
APPARATUS FOR THE SHARPENING OF CUTTERS
Original Filed Aug. 2, 1943 3 Sheets-Sheet 2

Inventor
EVO MALAGUTI
by Robert P. Outerbridge
his Attorney

Patented Aug. 26, 1947

2,426,363

UNITED STATES PATENT OFFICE 2,426,363

APPARATUS FOR THE SHARPENING OF CUTTERS

Evo Malaguti, Wellesley, Mass.

Substituted for application Serial No. 469,989, August 2, 1943. This application filed July 31, 1945, Serial No. 608,045

16 Claims. (Cl. 51—225)

This application is a substitute for my application Serial No. 496,989, filed August 2, 1943.

The present invention relates to the grinding of rotary cutters and more particularly, but not exclusively, to devices for supporting and gauging angle type cutters so that their teeth may be properly sharpened by grinding operations performed on their lateral edges.

The sharpening of dull angle cutters presents a serious machine shop problem, and hitherto the only practicable solution so far as real accuracy is concerned has been to return dull cutters to the manufacturer for sharpening. But the difficulty with this procedure is that considerable delay may be involved from the time a dull cutter leaves a machine shop until it is returned sharpened, and as a result the shop must either stop cutting operations performed by that particular cutter until it is returned, or else must keep in tool inventory a relatively large number of spares so that sharp cutters of given characteristics are always on hand while other cutters having the same characteristics are away being sharpened. It will be at once apparent that the former situation means a halt to production, while the latter situation necessarily means increased dollar investment in tools, a matter which may be of serious concern to smaller shops.

In an effort to avoid the delay incurred when cutters are sent out for sharpening and hence to avoid the halting of production or to save the added expense involved in keeping an undue supply of spares on hand, some machine shops attempt their own grinding of the lateral edges of angle cutters to sharpen them. The usual procedure here is to mount a cutter on an arbor which is supported at its opposite ends by the centers of a grinder; clamp a suitable tooth rest to the grinder table so that all the cutter teeth may be brought successively to the same position for being ground; turn the grinder table so that it is disposed to the vertical plane of the grinding surface at one half the included angle of the cutter—30°, for example, where the included angle is 60°; and then move the grinder table vertically to effect the grinding of the teeth individually as they are brought successively to the position determined by the tooth rest.

But a number of difficulties arise when this procedure is attempted. It is not easy, and it is frequently impossible, to set the grinder table at the precise angle intended. One factor here is the condition of wear of the table-setting mechanism of the grinder, but a further and very important factor is the human element since it is a matter of well known machine shop experience that different workmen will in fact give a table different angular settings although each attempts to make the setting at the precise angle intended. But even if a satisfactory table setting is achieved, there remains the necessity of providing an angle of relief so that each ground tooth edge will have clearance. Where the structure of the grinder itself is such that one end of the centers-supporting head and tail stocks may be shimmed, this procedure is followed to provide a forward tip to the cutter and as a consequence cause the grinding surface to cut back on the teeth and thus provide clearance. But where the head and tail stocks can not be thus shimmed, the alternative procedure is one which can do no more than merely approach accuracy. As most angle cutters have their teeth radially cut, it will be apparent that with such a cutter arbor-mounted as above described, but not tipped, and with the grinder table set at a desired angle, no tooth clearance will be provided when the under or radial surface of a tooth lies in a horizontal plane, i. e., in a plane parallel to that of the table and at 90° to the grinding surface. As a consequence, it is the practice to drop the tooth to be ground so that its under or radial surface is angularly disposed downwardly from said horizontal plane—but while this practice provides clearance, it necessarily causes a departure from the intended included angle, and while the amount of departure may be very great if the cutter is positioned carelessly, the best operatives can do no more than produce an angularity which is off the true angularity by as much as from seven to fifteen minutes. For coarse work this aberration may be harmless but for precise work this aberration means rejects.

The object of the present invention is to obviate the difficulties set forth above and this object is achieved by providing a cutter-supporting and tooth-gauging construction which renders it unnecessary for a shop to send angle cutters out to be sharpened and yet makes possible the accurate angular disposition of the cutter teeth with respect to a grinding surface while providing a clearance which does not cause departure from the intended included angle.

To the accomplishment of this object and of others which will appear hereinafter, the various features of the present invention reside in certain constructions, combinations, and arrangements of parts, all fully described hereinafter and then set forth in the appended claims of invention, which claims possess advantages which will be readily apparent to those skilled in the art.

The various features of the present invention will be readily understood from reading this specification in the light of the accompanying drawings, which drawings illustrate the best physical embodiment of the invention at present known to the inventor and in which.

Referring to the drawings, the cutter holder is provided with a base portion 20 (Figs. 1–2 and 8–9) from which there upwardly and forwardly rises an extension 21 surmounted by a central post 22 (Figs. 1–4 and 8), these parts being shown integral merely for illustrative purposes. For convenience in manufacture, the rear surface of the base, extension, and post lie in a forwardly tipped plane, and the under surface of the base 20 also lies in a plane, being undercut from side to side and from front to rear, as indicated at 23 and 24 (Figs. 1–2), respectively, to minimize the over-all surface area to be machined to produce the plane. As will be more fully taken up infra, the forward tipping of the extension 21 and the post 22 functions in part to provide the grinding clearance referred to in the preamble to this specification, and while this tipping may be at any desired or suitable angle, the particular angularity shown (Figs. 1–2 and 9) between the bottom surface of the base 20 and the coplanar rear surfaces of the base, extension 21, and post 22 is 10°. The front surface 25 of the base 20 is a vertical machined surface, being at 90° to the bottom surface of the base, and the base right and left side surfaces 26 and 27, respectively, are likewise machined surfaces, being parallel and also at 90° to the bottom surface of the base 20 and its front surface 25.

The function of the above-described structure is to provide a support construction on which an angle cutter may be rotatably mounted so that the lateral edges of its individual teeth may be successively ground. To this end (Fig. 4), the upper portion of the post 22 is provided with a cylindrical passage 28 which has a longitudinal axis located at 90° to the planar rear surface of the post and lying in a vertical plane which is 90° to the plane of the vertical base surface 25. The cylindrical passage 28 receives the reduced cylindrical barrel portion 29 of an adapter 30, while forwardly the adapter 30 is provided with an enlarged cylindrical portion 31 the rear face of which abuts the front face of the post 22, and forwardly of the cylindrical portion 31 the adapter 30 is provided with a reduced cylindrical portion 32. The adapter is secured to the post 22 by means of a set screw 33 which extends downwardly through the top of the post into a depression 34 formed in the barrel 29, and from a point slightly forward of the rear face of the post 22 the barrel 29 is provided with a rearwardly extending reduced cylindrical portion 35 which slidably receives a cylindrical cover 36.

Figure 2:
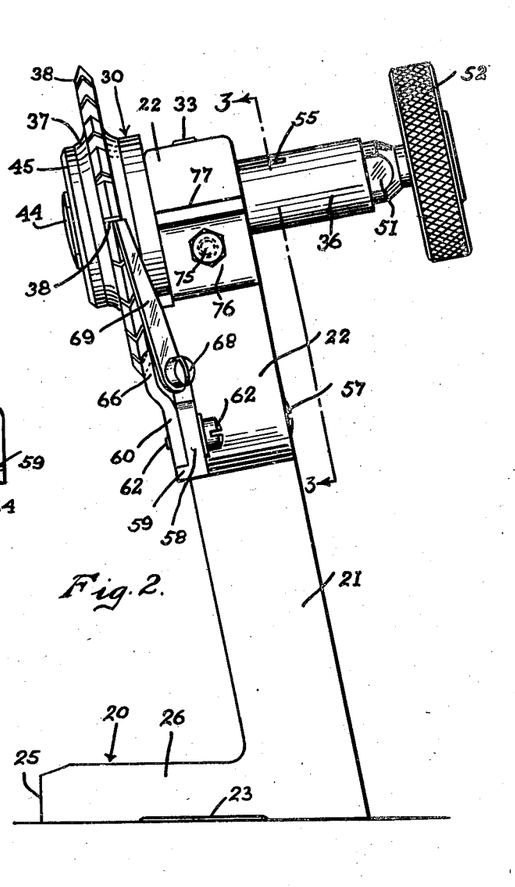
Fig. 2 is a view in right side elevation of the cutter holder.
Figures 3, 4, 5, 6, 7:
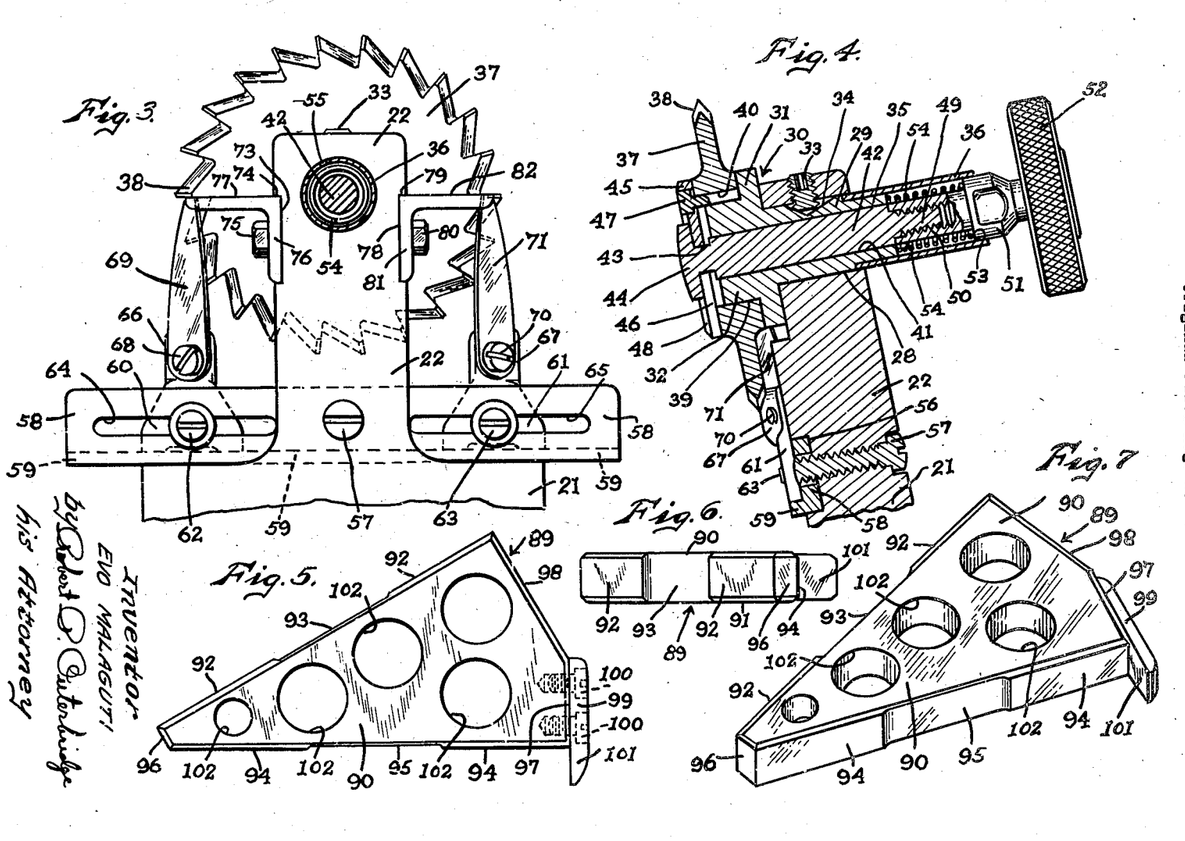
Fig. 3 is a detail elevation view of the rear of the cutter holder, taken along the line 3—3 of Fig. 2.
Fig. 4 is a detail view in right sectional elevation of the cutter holder, taken along the line 4—4 of Fig. 1.
Fig. 5 is a view in plan of the gauge plate used for positioning the holder on a grinder table in angular position with respect to a grinding surface.
Fig. 6 is a view in elevation of the gauge plate, viewed from the small end.
Fig. 7 is a view in perspective of the gauge plate.

The forward reduced cylindrical portion 32 of the adapter functions to receive rotatably an angle cutter 37 (Figs. 1–3 and 8) herein shown merely for illustrative purposes as being of the double angle type and having twenty-two radially cut teeth 38 adapted to cut a V-groove or thread. As is well understood, the cutter 37 has the usual central hub passage 39 (Fig. 4) and keyway 40 by which it may be mounted in a machine tool, and in the mounting of the cutter on the adapter 30 the cutter passage 39 fits slidably over the adapter reduced portion 32 with the rear face of the cutter hub engaging the front face of the adapter cylindrical portion 31, as shown in Fig. 4.

In order to removably secure the cutter 37 to the adapter reduced portion 32 and to effect rotation of the cutter on the holder, the adapter 30 is provided with a cylindrical passage 41 (Fig. 4) which is coaxial with the post passage 28 and which rotatably receives a shaft 42 provided forwardly with a reduced portion 43 and with a squared front enlargement or button 44 having preferably rounded corners and a flat rear face at substantially 90° to the axis of the shaft 42. Abutting flatwise the front face of the hub of the cutter 37 is a washer 45 (Figs. 1–2, 4 and 8) which is provided with a radial slot 46 in which the reduced portion 43 of the shaft 42 is received and with a pin 47 which extends rearwardly into the cutter keyway 40. The front face of the washer 45 is countersunk to provide a depression 48 having parallel sides which are spaced apart substantially the width of the button 44 so that it may be non-rotatably received in the depression. Rearwardly the shaft 42 is provided with a reduced threaded portion 49 which is received by the forward reduced portion 50 of a shaft 51 terminating rearwardly in a hand wheel 52, and interposed between the rear face of the adapter reduced portion 35 and the shoulder 53 formed by the junction of the shaft 51 and its forward reduced portion 50 is a spring 54 coiled about the reduced portions 35 and 50 and located within the cylindrical cover 36. The shaft 51 is slidably received by the rear portion of the cover 36, and forwardly the cover fits into the post passage 28 in abutment with the rear annular face of the adapter barrel 29, the cover 36 being slotted at its forward end, as indicated at 55 (Figs. 2, 3 and 8) to insure this fit.

By reason of the above-described structure the cutter 37 is removably and rotatably mounted on the post 22 and therefore on the cutter holder as a whole. Since the adapter 30 is fast in the passage 28, the spring 54 exerts a rearward pressure against the shaft shoulder 53, and since the shaft 51 is threaded to the shaft 42 the pressure of the spring 54 serves to hold the button 44 in the washer depression 48 and as a consequence press the washer 45 against the cutter 37 so that the latter engages the front face of the cylindrical portion 31 of the adapter 30. In view of the reception of the button 44 in the washer depression 48, it will be seen that when the hand wheel 52 is rotated the washer 45 necessarily rotates with it, and since the washer pin 47 fits in the cutter keyway 49, the cutter itself necessarily rotates about the axis of the shaft 42 when the hand wheel 52 is turned. As a consequence it will be seen that by rotation of the hand wheel 52 the teeth 38 of the cutter 37 may be successively brought to a position or station for the performance of a grinding operation upon them, and it will also be seen that since the axis of rotation of the shaft 42 and of the cutter 37 is at 90° to the planar rear surface of the post 22, said rotational axis is forwardly and downwardly tipped 10° from the vertical.

Referring now to angle cutters in general, they are of either the single angle or double angle type, this second type being the one illustrated at 37 (Figs. 1-4 and 8). The included angle of each tooth in stock sizes is usually either 45° or 60° for the single angle type and 45°, 60° or 90° for the double angle type, with the angle being equally disposed on each side of a center plane in this latter case and providing cutting edges on both sides of each tooth. The double angle cutter 37 shown in the drawings has a 60° included angle, for illustrative purposes only. A single angle cutter may be either right hand or left hand, depending upon the intended direction of rotation during cutting, while right handedness and left handedness of the double angle type are provided by simply reversing the mounting of the cutter in a machine. A further point about angle cutters, whether of the single angle or double angle type, is that their teeth are usually radially cut, by which there is meant that the under surface of each tooth (see Figs. 1 and 3, for example) lies in a plane which is radial of the cutter.

In view of the angularity of the lateral edges of the teeth of angle cutters, it will be apparent that in order for a given tooth edge to be located in proper relation to a grinding surface so as to permit edge sharpening at the proper angle, the cutter as a whole must be angularly disposed to the grinding surface at one half the inclined angle of the cutter teeth. From this it follows that the only tooth edge which a grinding surface can touch is that tooth edge which is nearest the grinding surface, and where the grinding surface is in a vertical plane, for example, that particular tooth edge must be horizontal if the included angle of the tooth edge is to be preserved during grinding and not changed. If there were no need of providing the teeth with an angle of relief to give them cutting clearance, it will be apparent that a cutter could be mounted in a vertical plane disposed at the proper angle to a vertical grinding surface, with the teeth brought successively to a position in which the under or radial surface of each lies in a horizontal plane. But since a clearance angle of relief must be provided if the cutter is to function after being ground, the under or radial surface of each cutter tooth must not lie in a horizontal plane when the grinding surface is in a vertical plane, although the horizontal location of each cutter tooth edge must be maintained. In order to achieve this result with the present invention, there is contemplated the employment of tooth rest constructions and also means for gauging the position of the tooth rests to insure that each particular cutter tooth edge is horizonal while being ground, although the under or radial surface of that tooth is not horizontal.

To the first of these ends the front of the upper part of the extension 21 and of the lower part of the post 22 is provided with a recess 56 (Fig. 4) in which there is held by means of a screw 57 a transverse plate 58 (Figs. 1-4 and 8) which extends beyond the opposite sides of the extension 21 and is provided with a forward shelf 59 having a machined upper surface. The shelf 59 forms a support for base members 60 and 61 which are slidable along the shelf at opposite sides of its center and are adjustably held in position by means of screws 62 and 63, respectively, extending forwardly into the base members through respective slots 64 and 65 formed in the plate 58. The base member 60 is provided with an upper portion 66 which is angularly disposed so as to extend inwardly and rearwardly in the direction of the post 22, and the base member 61 is provided with an upper portion 67 which is correspondingly angularly disposed in the direction of the post 22. Mounted on the base upper portion 66 by means of a screw 68 is an upwardly extending tooth rest element comprising a spring finger 69 (Figs. 1-3, 8, and 11), and mounted on the base upper portion 67 by means of a screw 70 is an upwardly extending tooth rest element comprising a spring finger 71 identical in construction with the finger 69. With reference to Figs. 3 and 4, the member portions 66 and 67 are forwardly tipped so that the spring fingers 69 and 71 carried thereby are themselves forwardly tipped, and as shown best in Fig. 11 the top surface of the finger 69 is flat and is at 90° to the major axis of the finger, while the lower end of the finger is provided with an opening 72 through which the shank of the screw 68 passes and which is appreciably larger than the shank so that the finger 69 may be adjusted vertically on the member portion 66. The spring finger 71 has an identical top surface and lower opening construction.

Figure 1:
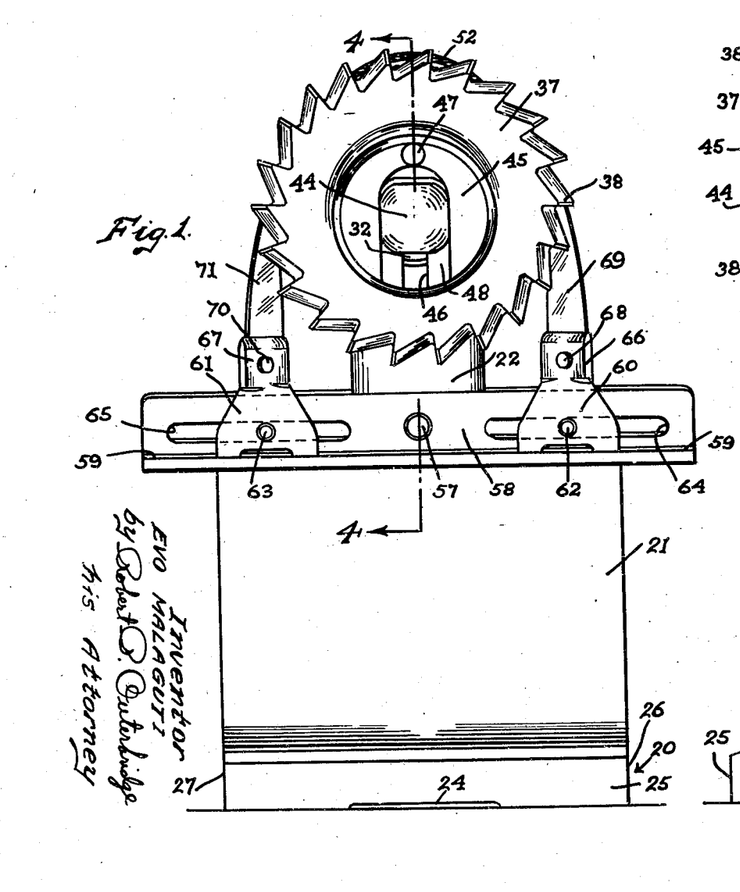
Fig. 1 is a view in front elevation of the cutter holder.

It is the function of the spring finger 69 to locate the cutter teeth 38 successively so that each tooth edge facing the grinding surface may be ground when the cutter 37 is mounted on the holder construction in such position that its downward cutting direction of rotation is clockwise (viewing Fig. 1). Since it is necessary that each particular tooth edge be horizontal when the grinding surface is vertical if the tooth edge is to be ground at the proper angle, the height of the top surface of the finger 69 is at such level as to make this edge horizontal location possible, and by reason of the forward tipping of the finger 69 it will be seen (Fig. 2) that the top surface of the finger lies under and forms an abutment for the under or radial surface of each cutter tooth. The finger 69 being of spring material, its top will snap under the successive tooth radial surfaces as the hand wheel 52 is rotated counter-clockwise (viewing Fig. 1), and by reversing the pressure on the hand wheel each cutter tooth 38 may be manually held in abutment with the top of the finger 69.

In order to gauge the position of the spring finger 69, i. e., in order to insure that its top surface will be in such location that the front edge of each tooth 38 when abutting the finger top surface is horizontal, the present invention contemplates a gauge construction by the use of which the finger 69 may be properly located independently of the cutter 37 and in its absence from the holder. To this end the side of the post 22 opposite the spring finger 69 is provided with a recess 73 having an upper shoulder 74 which is at 90° to the rear surface of the post 22 and which is located at the level of the rotational axis of the shaft 42 so that this axis lies in the plane of the shoulder 74, i. e., so that a vertical plane through the rotational axis of the shaft 42 is intersected by the plane of the shoulder 74 along a line which is itself the rotational axis of the shaft 42. Mounted in the recess 73 by means of a screw 75 is the vertical leg of a 90° angle member 76 the other leg of which is outstanding and has a machined top surface 77 which is coplanar with the surface of the shoulder 74. By reason of this construction the rotational axis of the shaft 42 lies in the plane of the angle member top surface 77 and as a consequence this top surface comprises a gauge surface which is a fixed and constant part of the holder construction.

In using this top surface 77 as a gauge, a workman loosens the screw 68 holding the spring finger 69 in position and lays a rule on the surface 77 with a portion of the rule extending over the finger 69. The finger is thereupon moved vertically until its top surface touches the overhanging rule portion, after which the screw 68 is tightened to maintain the finger 69 in the position thus gauged. This gauging operation is accomplished while there is no cutter 37 mounted on the adapter 30, but if a cutter is there present, this same gauging operation for the finger 69 may be performed by first temporarily loosening the screw 62 and sliding the base member 60 outwardly along the shelf 59, after which the screw 68 is loosened, a rule is laid on the gauge surface 77, the finger 69 adjusted vertically as above described, and the screw 68 then tightened, the base member 60 thereafter being moved inwardly along the shelf 59 until the top surface of the finger 69 is properly located transversely so as to be abuttable with the under or radial surface of each cutter tooth 38. Either of these procedures may also be followed to test a mounted spring finger for wear of its top surface.

But whether the gauging of the spring finger 69 be performed in either of the two situations above described, it will be seen that when a cutter 37 is mounted on the holder the fact that the teeth 38 are radially cut causes their under or radial surfaces successively to lie in the plane of the gauge surface 77 when abutting the top surface of the spring finger 69 and as a consequence the front edge of each cutter tooth so located is horizontal even though the cutter as a whole is tipped forwardly.

In view of the fact that the teeth of the cutter 37 are radially cut it will be seen that when the cutter is mounted on the holder for rotation in a clockwise (Fig. 1) downward cutting direction, the spring finger 71 is inoperative since the radial surfaces of the teeth 38 to the left of the vertical center of the post 22 are upwardly directed at various angles. When, however, the position of the cutter 37 is reversed on the holder so that the cutter is mounted for rotation in a counter-clockwise (Fig. 1) downward cutting direction, the spring finger 71 becomes operative and the spring finger 69 becomes inoperative, it being apparent that the purpose of thus reversing the position of the cutter 37 is to bring forward, or opposite to the grinding surface, those tooth edges which are on the side of the cutter away from the grinding surface and hence not ground during the tooth gauging operation of the spring finger 69.

The height of the top surface of the spring finger 71 is at the same level as that of the top surface of the finger 69, and to gauge the finger 71 to achieve this result the side of the post 22 opposite the spring finger 71 is provided with a recess 78 (Fig. 3) having an abutment shoulder 79, these parts corresponding in form and location to the recess 73 and its shoulder 74, respectively, and there being mounted in the recess by means of a screw 80 the vertical leg of a 90° angle member 81 the other leg of which is outstanding and has a machined top surface 82 corresponding in location and form to the top surface 77 of the angle member 76. By reason of this construction the gauging surfaces 82 and 77 are coplanar, the surface 82 is a fixed or constant part of the holder construction, and the position of the spring finger 71 may be gauged by use of a rule lying on the gauging surface 82 in the same manner as above described for gauging the location of the spring finger 69 from the gauging surface 77.

Three points in particular about the holder construction as so far described are to be noted. The first point is that by reason of the top surfaces of the spring fingers 69 and 71 being in the plane of the coplanar gauging surfaces 77 and 82, the edges of the radially cut teeth 38 opposite a vertical grinding surface will be successively horizontal when their under or radial surfaces are successively brought into engagement with the top surface of the finger 69 or the finger 71, as the case may be. The second point is that since the axis of rotation of the cutter 37 lies in the plane of the under or radial surface of each cutter tooth regardless of its location, and since the axis of rotation of the cutter 37 is forwardly and downwardly tipped at 10° from the vertical in the embodiment of the invention illustrated in the drawings, when the under or radial surface of a tooth engages a spring finger 69 or 71, as the case may be, that tooth surface will itself be forwardly and downwardly tipped at 10° although the edge of that surface opposite the grinding surface remains horizontal. As a consequence, although the edge of each cutter tooth is ground with a 10° angle to give clearance, the intended angularity of the cutting edge of each tooth is maintained, i. e., remains one half the included angle. The third point is that since the base front surface 25 is vertical and lies in a plane which intersects at 90° a vertical plane in which there lies the rotational axis of the shaft 42 and of the cutter 37, the front edge of each cutter tooth 38, when its under or radial surface is engaged with a finger 69 or 71, is disposed angularly to the plane of the vertical base face 25 at an angle which is one half the included angle of each tooth. Where that included angle is 60° for example, as above referred to, the front edge of each tooth when located as stated is thus angularly disposed at 30° to the vertical plane of the base front surface 25.

Figure 8:
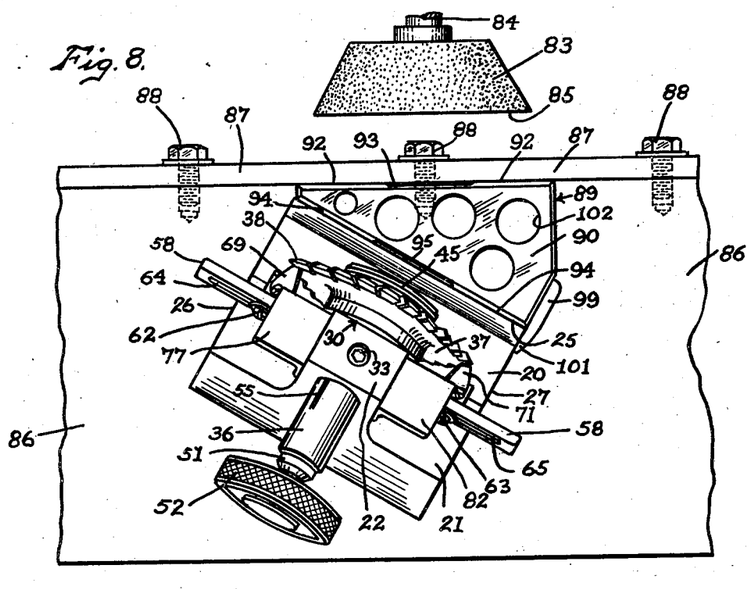
Fig. 8 is a view in plan showing the cutter holder and gauge plate on a grinder table with the parts in position for the performance of a grinding operation upon a lateral edge of an angle cutter tooth.

The present invention contemplates that the cutter holder, with its spring fingers 69 and 71 and its gauging surfaces 77 and 82, be as a unit locatable on and removable from the table of a grinder. In Fig. 8 elements of a grinder are conventionally shown, comprising a saucer-type grinding wheel 83 mounted on a driven shaft 84 and provided with a vertical grinding surface 85; a horizontal grinder table 86; and a vertical plate 87 which is secured to the front of the table 86 by means of bolts 88 and extends above the upper surface of the table with its inner surface in a vertical plane to provide an abutment. For illustrative purposes only the table 86 is to be considered as of the magnetic type, and by means of the usual adjusting mechanisms (not shown) associated with grinder constructions, the table 86 is adjustable vertically with respect to the wheel 83, is locatable at a "zero" setting so that the inner vertical surface of the plate 87 is in a plane parallel to the vertical grinding surface 85, is movable along a path parallel to the plane of the vertical grinding surface 85, and is movable horizontally toward the plane of the grinding surface 85 to effect grinding engagement with a work piece supported from the table. It will be apparent from examination of Fig. 8 that the holder base 20 is adapted to rest on the table 86 at any desired angle with respect to the grinding surface 85 and that when current is supplied to the table magnetic elements (not shown) the holder construction will be secured to the table so that the cutter 37 is held in a desired position of angularity with respect to the grinding surface 85.

In order to gauge the location of the cutter 37 with respect to the grinding surface 85 when the holder construction rests on the table 86, i. e., in order to insure that the front edge of a cutter tooth 38 abutting the top surface of a spring finger 69 or 71, as the case may be, is parallel with the plane of the grinding surface 85, the present invention contemplates the use of a precision gauge plate 89 (Figs. 5-8) cooperating with the holder base vertical face 25 and with the inner vertical surface of the table abutment plate 87 to obviate the necessity of eye adjustment of table angularity, with the consequent grinding aberration referred to in the preamble to this specification and which it is the principal object of the present invention to prevent.

With particular reference to Figs. 5-7, the gauge plate 89 has top and bottom machined parallel surfaces 90 and 91, respectively, either of which is adapted to rest flatwise on the table 86 as indicated in Fig. 8. At one side the plate 89 is provided with machined surface portions 92 which lie in a plane at 90° to the upper and lower surfaces 90 and 91 and which are relieved by a depression 93 to minimize the chance of error in machining. At another side the plate 89 is provided with other surface portions 94 which are machined and also lie in a plane at 90° to the upper and lower surfaces 90 and 91 and which are relieved by a depression 95 to minimize the chance of error in machining. The plane of the surfaces 92 and the plane of the surfaces 94 are disposed to each other at one half the included angle of an angle cutter, and since the included angle of the cutter 37 illustrated is 60°, the angularity of the planes of the surfaces 92 and 94 is shown as 30°. The planes of the surfaces 92 and 94 preferably do not converge to an edge but are cut short thereof by a surface 96, and the plate 89 has two other surfaces, one of these being a surface 97 which is at 90° to the top and bottom surfaces 90 and 91 and also to the adjacent surface portion 94, and the other of these surfaces being a surface 98 connecting the surface 97 with the adjacent machined surface portion 92. Further structure of the gauge plate 89 comprises a bar 99 secured to the surface 97 by means of screws 100 and extending outwardly beyond the adjacent surface portion 94 at 90° thereto to form an abutment lip 101, and passages 102 of various sizes formed through the thickness of the plate 89 to decrease its weight. Preferably each edge portion of the plate top and bottom surfaces 90 and 91 is bevelled, as indicated in Figs. 5-8, and the height of the lip 101 is less than the vertical thickness (Fig. 6) of the plate 89 so as to extend outwardly between the planes of the surfaces 90 and 91.

In using the gauge plate 89 to position the holder construction, and therefore the cutter 38 mounted thereon, on the table 86 (Fig. 8) so that the cutter teeth may be properly ground, the gauge plate is placed flatwise on the table with the lip 101 to the right (viewing Fig. 8) and with the coplanar machined surfaces 92 in abutment with the inner vertical face of the table abutment plate 87, the table 86 being at "zero" setting so that the plane of this plate 87 is parallel with the grinding surface 85. Thereafter the base 20 of the holder is placed on the table with its base front surface 25 abutting the coplanar machined surfaces 94 of the plate 89 and with the side 27 (viewing Fig. 8) of the base 20 in abutment with the plate lip 101. In this position the holder base front surface 25 is, without the necessity of eye adjustment or of angular adjustment of the table 86 with respect to the grinding surface 85, angularly disposed 30° (viewing Fig. 8) to the inner surface of the plate 87 and to the vertical grinding surface 85, and as a consequence the front edge of the particular cutter tooth 38 resting on the top surface of the spring finger 69 is parallel with the vertical grinding surface 85, it being borne in mind that 30° is one half the included angle of the illustrated cutter teeth and that the particular tooth front edge in question is angularly disposed 30° to the vertical front face 25 of the base 20. With the holder and the plate 89 thus positioned, the table 86 is moved toward the saucer wheel 83 near enough so that a suitable portion of the grinding surface 85 may be in a position to engage properly the front edge of the tooth 38 resting on the finger 69, and thereafter the table 86 is magnetized and is then moved linearly or is reciprocated so that the grinding surface 85 engages the front edge of said cutter tooth and grinds it. The parallelism of the grinding surface 85 and of the front edge of the tooth to be ground insures that the desired tooth edge angularity is maintained during grinding and is not destroyed, and the forward tipping of the cutter 37 as a whole, as explained above, insures that the tooth edge is ground with clearance. By reason of this arrangement the edges of all the teeth 38 on one side of the cutter 37 may be successively ground, the teeth being successively brought into abutment with the top surface of the finger 69 by rotating the hand wheel 52 successively clockwise (viewing Fig. 8) and then reversing the direction of pressure on the hand wheel to maintain each tooth 38 engaged with the top surface of the spring finger 69 while the front edge of each tooth is being ground.

When the lateral tooth edges on one side of the cutter 37 have all been ground, the hand wheel 52 is pushed forward against the resistance of the spring 54, after which the washer 45 and the cutter 37 are removed so that the latter may be turned over and mounted on the adapter with those tooth edges forward which were formerly disposed away from the grinding surface 85. Thereafter the washer 45 is replaced and pressure on the hand wheel 52 released to complete the mounting of the cutter 37 in reversed position on the holder, whereupon the gauge plate 89 is turned over to cause the lip 101 to be at the left, the angle of the surfaces 92 and 94 to diverge to the left (viewing Fig. 8), and the base surfaces 25 and 26 to be located in abutment with the surfaces 94 and the lip 101, respectively, while the gauge plate surfaces 92 abut the inner surface of the table plate 87. Thus relocated, the holder base surface 25 is angularly disposed 30° to the left (viewing Fig. 8), and since the direction of cutting rotation of the cutter 37 is now clockwise (viewing Fig. 8), the spring finger 71 is operative and the finger 69 is inoperative, and rotating the hand wheel 52 incrementally counter-clockwise and then reversing the direction of pressure on it serves to bring the cutter teeth 38 successively into engagement with the top surface of the spring finger 71, whereupon the grinding of the now front edges of the teeth may be performed successively as explained above. With further reference to the lip 101, it will be apparent that by reason of the abutment it affords for the holder base sides 27 and 26, as the case may be, depending whether the holder base is turned angularly as shown in Fig. 8 or is in a reverse position of angularity while the cutter teeth abutting the top surface of the finger 71 are being ground, the holder as a whole and therefore the cutter 37 are properly located with respect to the grinding surface 85 so that the position of the table 86 need not be adjusted to effect proper grinding depth when the positions of the gauge plate 89 and of the holder construction are reversed from the Fig. 8 locations to those described above.

Figures 9, 11, 12:
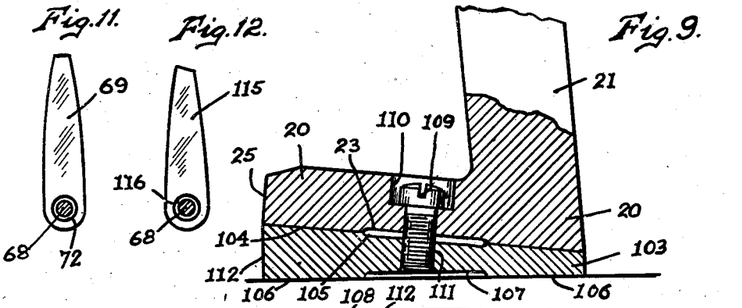
Fig. 9 is a detail view in right side elevation showing the use of a detachable angle base plate in association with the holder base to effect an angle of clearance different from that provided by the holder alone.
Fig. 11 is a view in front elevation of the spring finger portion of the tooth rest used when grinding a lateral edge of an angle cutter tooth.
Fig. 12 is a view in front elevation of a substitute spring finger used when grinding the outer end of an angle cutter tooth.
Figure 10:
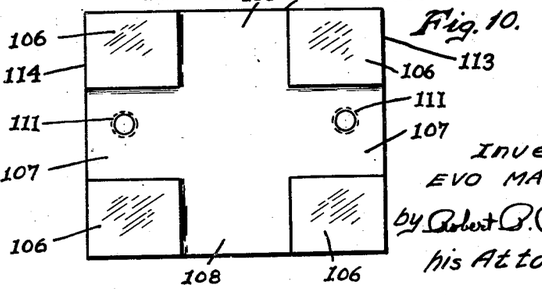
Fig. 10 is a view in underside plan of the angle base plate shown in Fig. 9.

The holder construction as a whole illustrated in Figs. 1–4 and 8 provides a grinding clearance of 10°. If it be desired, however, to have a different degree of clearance, means may be provided to increase or decrease this particular 10° angularity. To this end a detachable base plate 103 (Figs. 9–10) may be supplied having a planar machined top surface 104 relieved by a side to side undercutting 105 and a front to rear undercutting (not shown) corresponding to the undercuttings 23 and 24, respectively, of the bottom surface of the base 20, and the base plate 103 may also be provided with a planar machined under surface 106 undercut as indicated at 107 and 108 in correspondence with the undercutting of the top surface 104. The top and bottom surfaces 104 and 106 are shown in Fig. 9 disposed to each other at an angle of 5°, and it will be noted that this angularity diverges forwardly, i. e., to the left, viewing Fig. 9. With this construction the 10° forward tipping of the planar rear face of the base 20, extension 21, and post 22 with respect to the under surface of the base 20 is reduced by 5°, and as a result the rotational axis of the shaft 42 (Fig. 4) and therefore that of the cutter 37 is forwardly and downwardly tipped at only 5° from the vertical so that the angle of relief to give clearance to each ground tooth edge is only 5°. The plate 103 is removably secured to the base 20 by means of screws 109 (only one of which is shown) having heads received in countersinks 110 formed in the base 20 and having shanks threaded in openings 111 tapped in the plate 103. The front face 112 of the plate 103 is at an angle of 90° to the bottom surface 106 as are the plate right and left side surfaces 113 and 114, respectively; the bottom area of the plate 103 is preferably, although not necessarily, substantially the same area and shape as the bottom surface of the base 20 of the holder construction; and when the plate 103 is assembled with the base 20 the plate surface 112 lies in a plane which is intersected at 90° by a vertical plane in which there lies the rotational axis of the shaft 42 and of the cutter 37. The angularity of the plate surfaces 104 and 106 is shown as being 5° merely for disclosure purposes, and it will be understood that by varying this angularity in other plates of corresponding construction the degree of clearance for each ground tooth edge may likewise be varied.

As stated above, the cutter 37 is shown merely for illustrative purposes as having pointed teeth, i. e., teeth adapted to cut a V-thread or groove. But in cutting threads or grooves of the U. S. Standard type, or of any other type having a flat root, the teeth of the cutter used are not pointed as shown but are cut off flat across their outer ends. The width of this flat is usually a definite fraction of the pitch of the thread or groove, and as a consequence it will be seen that when the lateral edges of the teeth of a cutter of such type are ground to sharpen them, the width of the flat is somewhat decreased, making it necessary that the flat ends be ground to restore to them the width they should have.

This grinding off the ends of the teeth may be accomplished with the present invention by dispensing with the gauge plate 89 and by substituting a spring finger 115 (Fig. 12) for the spring finger 69, for example. Explaining this in detail, the finger 115 has the same general shape as the finger 69 and has a lower opening 116 corresponding to the opening 72, but the finger 115 is somewhat shorter than the finger 69 and has a top surface which is not a 90° to the major axis of the finger but is instead angularly disposed downwardly to the right. By reason of this construction a cutter tooth does not have its radial or under surface coplanar with the gauging surface 77 when the tooth engages the top of the finger 115, and instead the tooth is dropped down somewhat along its rotative path. From this it follows that when a cutter tooth front edge is engaged by a grinding surface that is parallel therewith, the portion of the tooth extending upwardly and away from its front edge will not be ground in a plane at 90° to the under or radial surface of the tooth but will instead be ground in a plane which is less than 90° to said under or radial surface. As a consequence, the front cutting edge of the tooth is provided with clearance.

In using the illustrated embodiment of the present invention to accomplish this result with a spring finger 115 substituted on the base member portion 66 for the finger 69, the holder is placed on the table 86 with the base side surface 26 engaging the inner surface of the table plate 87. By reason of this arrangement the front edge of the cutter tooth resting on the finger 115 is parallel with the grinding surface 85 and movement of the table 86 as above described in grinding the lateral edges of the teeth effects the grinding with clearance of the front edge of each tooth, the cutter being incrementally rotated to effect the front edge grinding of all the teeth. The degree of clearance provided by the shortened tooth 115 may be any found suitable or desirable for the particular cutter to be ground, and except for insuring that the top of the tooth finger 115 is below the plane of the gauge surface 77, no gauging of the vertical location of the top of the finger 115 is necessary since there is not involved in grinding the outer ends of the teeth the precision necessary in grinding each lateral tooth edge at one-half the included angle while providing the necessary clearance.

When desired, a substitute finger may be provided for the spring finger 71, this substitute being identical with the finger 115 except for having a top surface which extends downwardly to the left (viewing Fig. 12) and being mounted for operation with a cutter located on the adapter 30 to have a clockwise (viewing Fig. 8) downward cutting direction of rotation. In using such a substitute finger, the side surface 27 of the base 29 will, of course, abut the inner surface of the table plate 87 flatwise.

In view of the above description it is not believed that much further comment need be made on the operation as a whole of the cutter holder embodiment herein disclosed and shown in the drawings. It may be pointed out, however, that while the angle cutter 37 is of the double angle type, the principles of operation set forth above apply equally well to the sharpening of the lateral edges of the teeth of single angle type cutters. Stating this in a different way, where the cutting direction of rotation of a single angle cutter is downwardly to the right (viewing Fig. 1), the spring finger 69 forms the tooth rest or abutting element for gauging the location of the teeth during the grinding of the lateral edge of each, while the spring finger 71 forms the location gauging tooth rest or abutting element for the teeth of a single angle cutter the cutting direction of rotation of which is downwardly to the left (viewing Fig. 1). As a further point, it will be appreciated that while the central hub passage 39 in the cutter 37 shown may be the same size as the corresponding central hub passage in a cutter of either greater or lesser diameter, when a cutter hub passage corresponding to the hub passage 39 has a different diameter, a different adapter may be mounted in the post passage 28, this adapter being identical with the adapter 30 except that its forward cylindrical portion is of greater or lesser diameter than the forward cylindrical portion 32 of the adapter 30—a larger or a smaller washer, as compared to the washer 45, being substituted in this case also. When different adapters and washers are necessary, it will be understood that the base members 60 and 61 will be moved along the plate shelf 59 so that the top surfaces of the fingers 69 and 71 will be in position to abut the under or radial surfaces of the teeth of cutters of different diameters, and this sliding of the base members 60 and 61 applies also in the case of using with a different sized cutter a spring finger 115 or one corresponding thereto as a substitute for the finger 71. The holder construction shown is adapted to support relatively large cutters, of which the cutter 37 may be considered one example, and for very small cutters it may be necessary to provide a holder construction built on a smaller scale. While the table 86 has been illustrated conventionally as being of the magnetic type, it will be appreciated that the holder construction and the gauge plate 89 may each be suitably clamped or otherwise secured to a grinder table which is not of the magnetic type. It will also be understood that the angularity between the planes of the machined surfaces 92 and 94 of the gauge plate 89 has been shown and described as 30° merely because the included angle of the cutter 37 shown is 60°. Where cutters having included angles of 45°, 90°, or any other angularity are to have their lateral edges sharpened, different gauge plates would be used having, respectively, angles of 22.5°, 45°, or any other angle that is one-half the included angle of the cutter in question, but otherwise corresponding to the gauge plate 89 shown.

Nothing herein explained is to be interpreted as limiting the present invention in the scope of its application to the particular structural features herein described and shown in the drawings for purposes of explanation and illustration. These features and the details of construction set forth are well suited to the particular embodiment of the invention shown, but the invention is not limited to this embodiment nor to its features either individually or in their conjoint use, and the true scope of the actual invention is set forth in the following claims which intentionally use generic terms that are inclusive of various modifications.

What is claimed as new is:

1. In a holder for a cutter having radially cut teeth, the combination with a support provided with a fixed gauging surface lying in a plane, said support being adapted to have a toothed cutter rotatably mounted thereon in such location that upon rotation of said cutter the radial surface of each cutter tooth may lie in said plane but is spaced from said fixed gauging surface, of a tooth rest provided with a surface adapted, upon rotation of the cutter, to engage the radial surface of each tooth; said tooth rest being movably mounted on the support so that the rest may be moved to cause its said surface to lie in said plane, and said fixed gauging surface having sufficient area so that an element having a straight edge or a planiform surface may lie on said fixed gauging surface and bridge the space between it and the tooth-engaging surface of the tooth rest for contact with said tooth rest surface so that it lies in said plane upon said movement of the tooth rest.

2. In a holder for a cutter having radially cut teeth, the combination with a support provided with a fixed gauging surface lying in a plane, said support being adapted to have a toothed cutter rotatably mounted thereon in such location that upon rotation of said cutter the radial surface of each cutter tooth may lie in said plane but is spaced from said fixed gauging surface, of a tooth rest base mounted on the support and provided with a tooth rest having a surface adapted, upon rotation of the cutter, to engage the radial surface of each tooth; said tooth rest being movably mounted on its base so that the rest may be moved to cause its said surface to lie in said plane, said tooth rest base being slidably mounted on the support to accommodate cutters of different diameters; and said fixed gauging surface having sufficient area so that an element having a straight edge or a planiform surface may lie on said fixed gauging surface and bridge the space between it and the tooth-engaging surface of the tooth rest for contact with said tooth rest surface so that it lies in said plane upon said movement of the tooth rest.

3. Structure such as set forth in claim 1, characterized by the fact that the support, including its gauging surface, and the tooth rest are as a unit locatable on and removable from the table of a grinder.

4. Structure such as set forth in claim 2, characterized by the fact that the support, including its gauging surface, the tooth rest base, and the tooth rest are as a unit locatable on and removable from the table of a grinder.

5. In a holder for a cutter having radially cut teeth, the combination with a support provided on at least one side with a fixed gauging surface lying in a plane, said support being adapted to have a toothed cutter rotatably mounted on the front thereof in such location that upon rotation of said cutter the radial surface of each cutter tooth may lie in said plane but is spaced from said fixed gauging surface, of a tooth rest base mounted on the support and provided with a tooth rest having a surface adapted, upon rotation of the cutter, to engage the radial surface of each tooth; said tooth rest being movably mounted on its base so that the rest may be moved to cause its said surface to lie in said plane, and the mounting of said tooth rest base being a slidable one transversely of the front of the support to accommodate cutters of different diameters, and said fixed gauging surface having sufficient area so that an element having a straight edge or a planiform surface may lie on said fixed gauging surface and bridge the space between it and the tooth-engaging surface of the tooth rest for contact with said tooth rest surface so that it lies in said plane upon said movement of the tooth rest.

6. Structure such as set forth in claim 5, characterized by the fact that the suport, including its gauging surface, the tooth rest base, and the tooth rest are as a unit locatable on and removable from the table of a grinder.

7. In a holder for a cutter having radially cut teeth, the combination with a support provided with a fixed gauging surface lying in a plane, said support being adapted to have a toothed cutter rotatably mounted thereon in such location that upon rotation of said cutter the radial surface of each cutter tooth may lie in said plane but is spaced from said fixed gauging surface, of a tooth rest base mounted on the support and provided with a tooth rest having a surface adapted, upon rotation of the cutter, to engage the radial surface of each cutter tooth; said tooth rest being movably mounted on its base so that the rest may be moved to cause its said surface to lie in said plane, said tooth rest base being mounted on the support for movement to any one of a plurality of positions thereon to accommodate cutters of different diameters, and said fixed gauging surface having sufficient area so that an element having a straight edge or a planiform surface may lie on said fixed gauging surface and bridge the space between it and the tooth-engaging surface of the tooth rest for contact with said tooth rest surface so that it lies in said plane upon said movement of the tooth rest.

8. Structure such as set forth in claim 7, characterized by the fact that the support, including its gauging surface, the tooth rest base, and the tooth rest are as a unit locatable on and removable from the table of a grinder.

9. In a holder for a cutter having radially cut teeth, the combination with a support having a fixed gauging surface lying in a plane, and rotatable means for mounting a toothed cutter in spaced relation to said fixed gauging surface but in such location that the axis of rotation of said mounting means lies in said plane, whereby upon rotation of said mounting means the radial surface of each cutter tooth may lie in said plane, of a tooth rest provided with a surface adapted, upon rotation of the cutter, to engage the radial surface of each tooth; said tooth rest being movably mounted on the support so that the rest may be moved to cause its said surface to lie in said plane, and said fixed gauging surface having sufficient area so that an element having a straight edge or a planiform surface may lie on said fixed gauging surface and bridge the space between it and the tooth-engaging surface of the tooth rest for contact with said tooth rest surface so that it lies in said plane upon said movement of the tooth rest.

10. In a holder for a cutter having radially cut teeth, the combination with a support having a fixed gauging surface lying in a plane, and rotatable means for mountnig a toothed cutter in spaced relation to said fixed gauging surface but in such location that the axis of rotation of said mounting means lies in said plane, whereby upon rotation of said mounting means the radial surface of each cutter tooth may lie in said plane, of a tooth rest base mounted on the support and provided with a tooth rest having a surface adapted, upon rotation of the cutter, to engage the radial surface of each cutter tooth; said tooth rest being movably mounted on its base so that the rest may be moved to cause its said surface to lie in said plane, said tooth rest base being mounted on the support for movement to any one of a plurality of positions thereon to accommodate cutters of different diameters, and said fixed gauging surface having sufficient area so that an element having a straight edge or a planiform surface may lie on said fixed gauging surface and bridge the space between it and the tooth-engaging surface of the tooth rest for contact with said tooth rest surface so that it lies in said plane upon said movement of the tooth rest.

11. In a holder for a cutter having radially cut teeth, the combination with a support having a fixed gauging surface lying in a plane, and rotatable means for mounting a toothed cutter in spaced relation to said fixed gauging surface but in such location that the axis of rotation of said mounting means lies in said plane, whereby upon rotation of said mounting means the radial surface of each cutter tooth may lie in said plane, of a tooth rest base mounted on the support and provided with a tooth rest having a surface adapted, upon rotation of the cutter, to engage the radial surface of each cutter tooth; said tooth rest being movably mounted on its base so that the rest may be moved to cause its said surface to lie in said plane, said tooth rest base being slidably mounted on the support to accommodate cutters of different diameters, and said fixed gauging surface having sufficient area so that an element having a straight edge or a planiform surface may lie on said fixed gauging surface and bridge the space between it and the tooth-engaging surface of the tooth rest for contact with said tooth rest surface so that it lies in said plane upon said movement of the tooth rest.

12. In a holder for a cutter having radially cut teeth, the combination with a support provided on at least one side with a fixed gauging surface lying in a plane, and rotatable means for mounting a toothed cutter on the support in spaced relation to said fixed gauging surface but in such location that the axis of rotation of said mounting means lies in said plane, whereby upon rotation of said mounting means the radial surface of each cutter tooth may lie in said plane, of a tooth rest base mounted on the support and provided with a tooth rest having a surface adapted, upon rotation of the cutter, to engage the radial surface of each cutter tooth; said tooth rest being movably mounted on its base so that the rest may be moved to cause its said surface to lie in said plane, the mounting of said tooth rest base being one for movement transversely of the front of the support to accommodate cutters of different diameters, and said fixed gauging surface having sufficient area so that an element having a straight edge or a planiform surface may lie on said fixed gauging surface and bridge the space between it and the tooth-engaging surface of the tooth rest for contact with said tooth rest surface so that it lies in said plane upon said movement of the tooth rest.

13. In a holder for a cutter having radially cut teeth, the combination with a support provided with a member having a fixed position thereon and also having a fixed gauging surface lying in a plane, said support being adapted to have a toothed cutter rotatably mounted thereon in such location that upon rotation of the cutter the radial surface of each cutter tooth may lie in said plane but is spaced from said fixed gauging surface, of a tooth rest provided with a surface adapted, upon rotation of the cutter, to engage the radial surface of each tooth; said tooth rest being movably mounted on the support so that the rest may be moved to cause its said surface to lie in said plane, and said fixed gauging surface having sufficient area so that an element having a straight edge or a planiform surface may lie on said fixed gauging surface and bridge the space between it and the tooth-engaging surface of the tooth rest so that movement of the tooth rest to cause said tooth-engaging surface to engage said straight edge or planiform surface results in said tooth-engaging surface lying in the plane of said fixed gauging surface.

14. In a holder for a cutter having radially cut teeth, the combination with a support provided with a member having a fixed position thereon and also having a fixed gauging surface lying in a plane, said support being adapted to have a toothed cutter rotatably mounted thereon in such location that upon rotation of the cutter the radial surface of each cutter tooth may lie in said plane but is spaced from said fixed gauging surface, of a tooth rest base mounted on the support and provided with a tooth rest having a surface adapted, upon rotation of the cutter, to engage the radial surface of each tooth; said tooth rest being movably mounted on its base so that the rest may be moved to cause its said surface to lie in said plane, said fixed gauging surface having sufficient area so that an element having a straight edge or a planiform surface may lie on said fixed gauging surface and bridge the space between it and the tooth-engaging surface of the tooth rest so that movement of the tooth rest to cause said tooth-engaging surface to engage said straight edge or planiform surface results in said tooth-engaging surface lying in the plane of said fixed gauging surface, and said tooth rest base being movably mounted on the support to accommodate cutters of different diameters.

15. In a holder for a cutter having radially cut teeth, the combination with a support provided with a fixed gauging surface lying in a plane so disposed that the lower surface of a cutter tooth and the top surface of a tooth rest may lie in said plane, said support being adapted to have a toothed cutter rotatably mounted thereon in such location that upon rotation of said cutter the radial surface of each cutter tooth may be a lower surface lying in said plane but is spaced from said fixed gauging surface, of an upwardly extending tooth rest provided with a top surface adapted, upon rotation of the cutter, to engage the radial surface of each tooth; said tooth rest being movably mounted on the support so that the rest may be moved to cause its said top surface to lie in said plane, and said fixed gauging surface having sufficient area so that an element having a straight edge or a planiform surface may lie on said fixed gauging surface and bridge the space between it and the tooth-engaging top surface of the tooth rest for contact with said top surface so that it lies in said plane upon said movement of the tooth rest.

16. In a holder for a cutter having radially cut teeth, the combination with a support provided with a fixed gauging surface lying in a plane so disposed that the lower surface of a cutter tooth and the top surface of a tooth rest may lie in said plane, said support being adapted to have a toothed cutter rotatably mounted thereon in such location that upon rotation of said cutter the radial surface of each cutter tooth may be a lower surface lying in said plane but is spaced from said fixed gauging surface, of a tooth rest base mounted on the support and provided with an upwardly extending tooth rest having a top surface adapted, upon rotation of the cutter, to engage the radial surface of each tooth; said tooth rest being movably mounted on its base so that the rest may be moved to cause its said top surface to lie in said plane, said tooth rest base being slidably mounted on the support to accommodate cutters of different diameters, and said fixed gauging surface having sufficient area so that an element having a straight edge or a planiform surface may lie on said fixed gauging surface and bridge the space between it and the tooth-engaging top surface of the tooth rest for contact with said top surface so that it lies in said plane upon said movement of the tooth rest.

EVO MALAGUTI.

REFERENCES CITED

The following references are of record in the file of this patent:

UNITED STATES PATENTS

| Number | Name | Date |
| --- | --- | --- |
| 355,414 | Reinecker | Jan. 4, 1887 |
| 412,589 | Bender | Oct. 8, 1889 |
| 439,154 | Holz | Oct. 28, 1890 |
| 1,352,703 | Tulek | Sept. 14, 1920 |
| 1,596,727 | Goldberg | Aug. 17, 1926 |
| 2,141,187 | Lehman | Dec. 27, 1938 |
| 2,379,594 | Ringzelli | July 3, 1945 |